(No Model.) 4 Sheets—Sheet 1.
G. W. MARSHALL.
COMBINED KEY SEAT AND KEY CUTTING MACHINE.
No. 416,479. Patented Dec. 3, 1889.
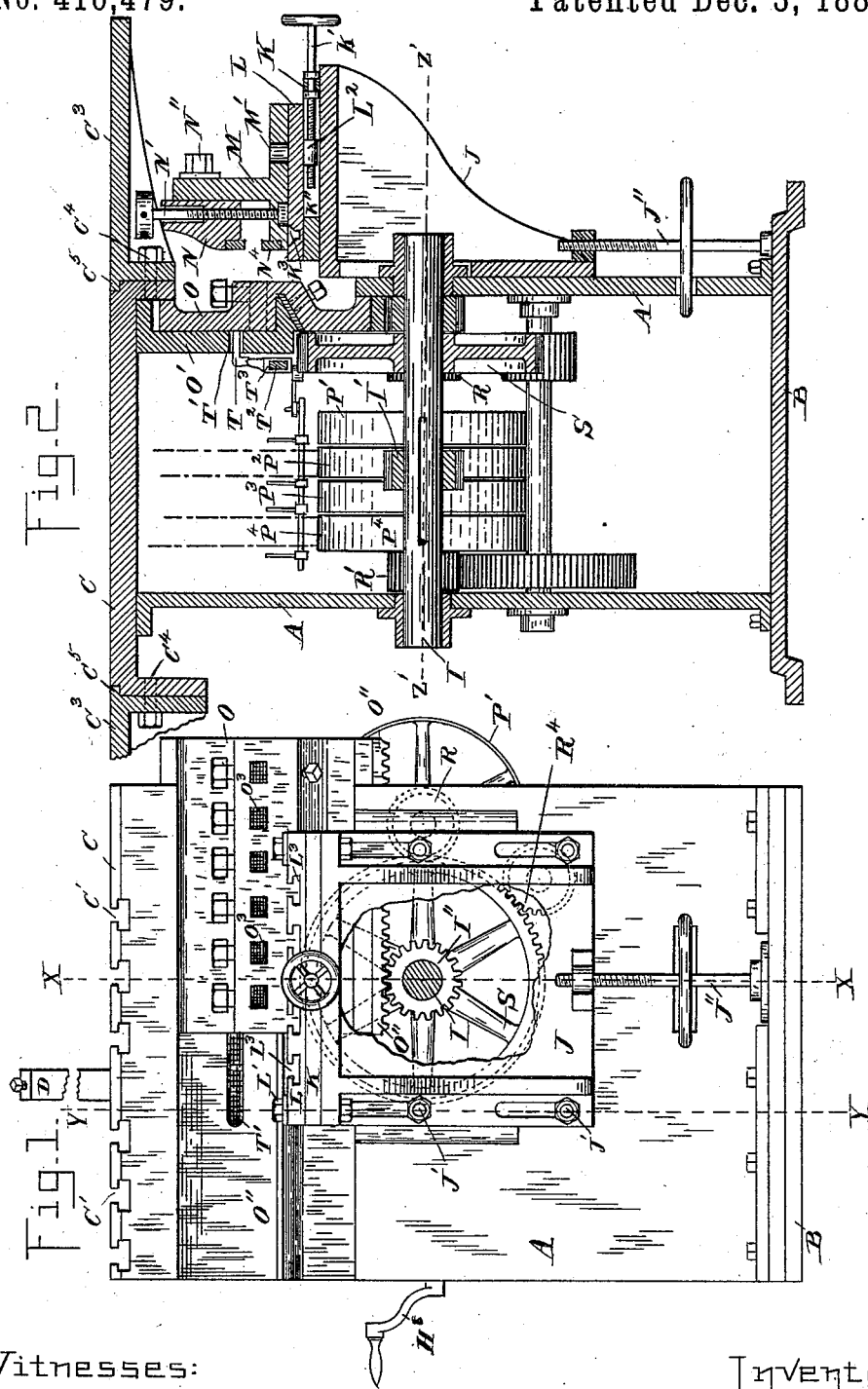
Witnesses:
Geo. A. Gregg.
J. Paul Mayer
Inventor:
George W. Marshall
By Thos. S. Sprague & Son
Atty.

(No Model.) 4 Sheets—Sheet 2.
G. W. MARSHALL.
COMBINED KEY SEAT AND KEY CUTTING MACHINE.
No. 416,479. Patented Dec. 3, 1889.
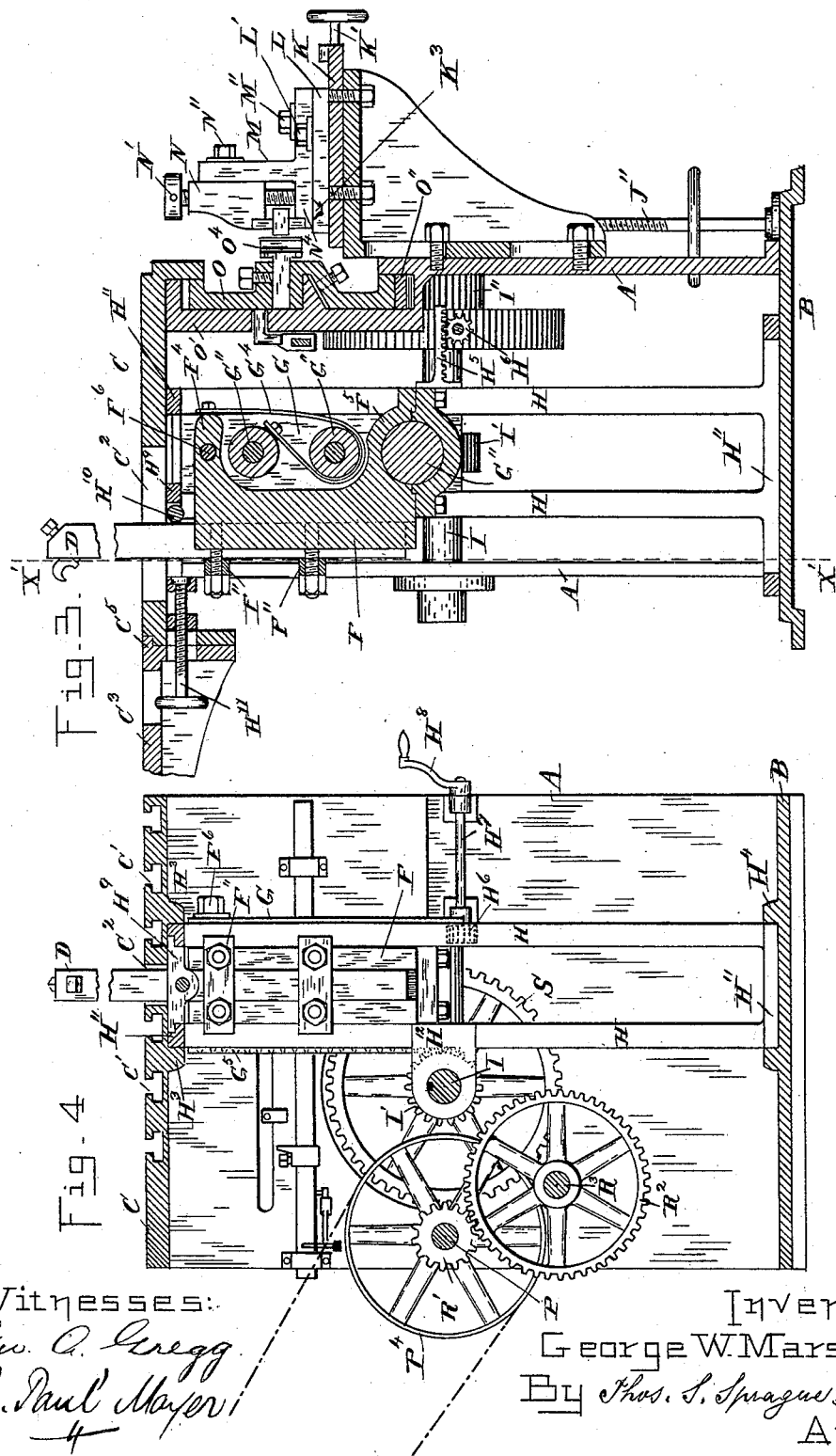
Witnesses:
Geo. A. Gregg
J. Paul Mayer
Inventor:
George W. Marshall,
By Thos. S. Sprague & Son
Atty (No Model.) 4 Sheets—Sheet 3.
G. W. MARSHALL.
COMBINED KEY SEAT AND KEY CUTTING MACHINE.
No. 416,479. Patented Dec. 3, 1889.

Witnesses:
Geo. A. Gregg
J. Paul Mayer

Inventor:
George W. Marshall
By Thos. S. Sprague & Son
Att'y.

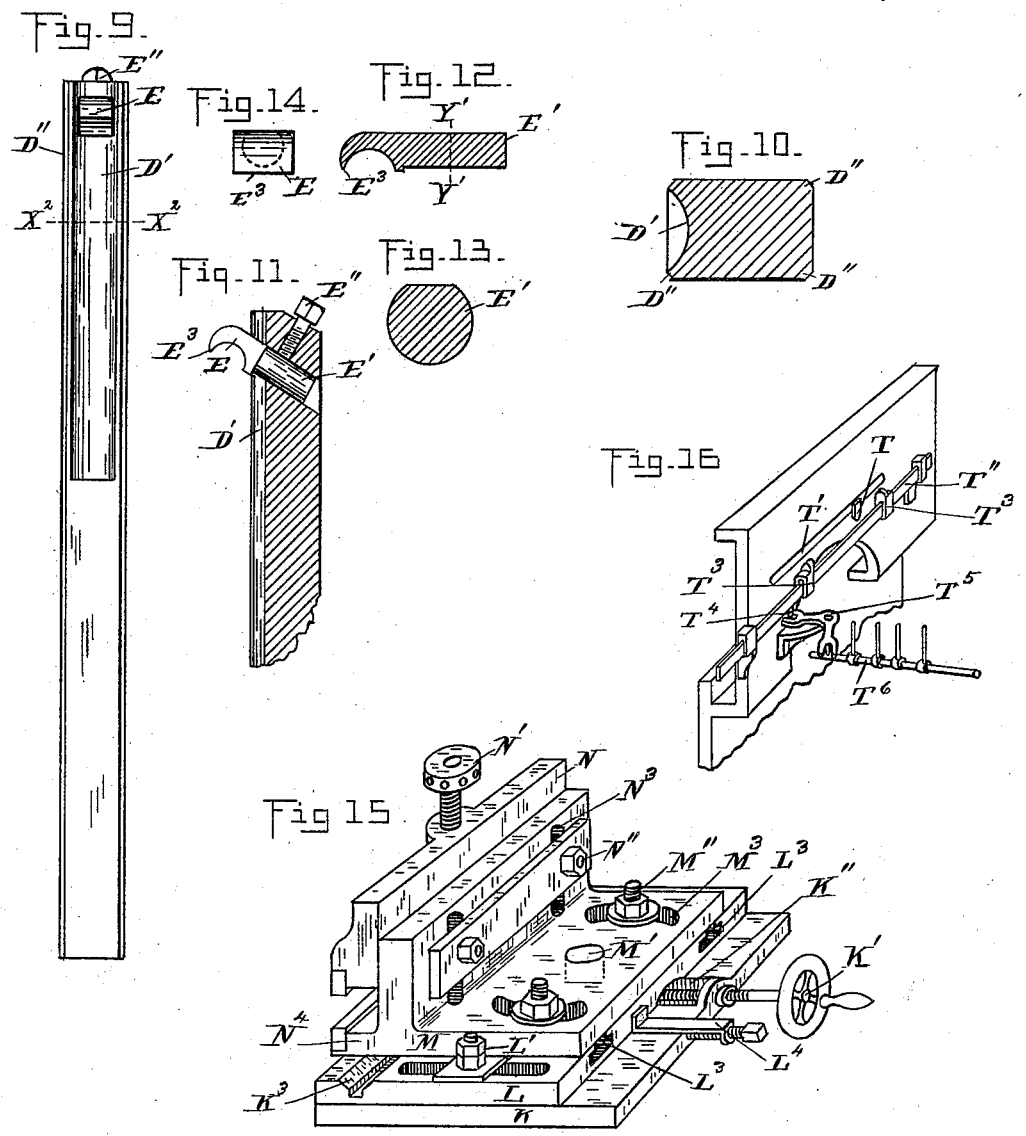

UNITED STATES PATENT OFFICE.

GEORGE W. MARSHALL, OF ROMEO, MICHIGAN.

COMBINED KEY-SEAT AND KEY-CUTTING MACHINE.

SPECIFICATION forming part of Letters Patent No. 416,479, dated December 3, 1889.

Application filed April 29, 1889. Serial No. 309,105. (No model.)

*To all whom it may concern:*

Be it known that I, GEORGE W. MARSHALL, a citizen of the United States, residing at Romeo, in the county of Macomb and State of Michigan, have invented certain new and useful Improvements in a Combined Key-Seat and Key-Cutting Machine, of which the following is a specification, reference being had therein to the accompanying drawings.

This invention relates to new and useful improvements in key-seating machines; and the invention consists in the novel construction, arrangement, and combination of the different parts, whereby the machine is adapted not only for cutting seats in the hubs of wheels, but is also adapted for cutting key-seats in shafts, and further permits of cutting keys on the same machine, all as more fully hereinafter described, and shown in the accompanying drawings, in which—

Figure 5:
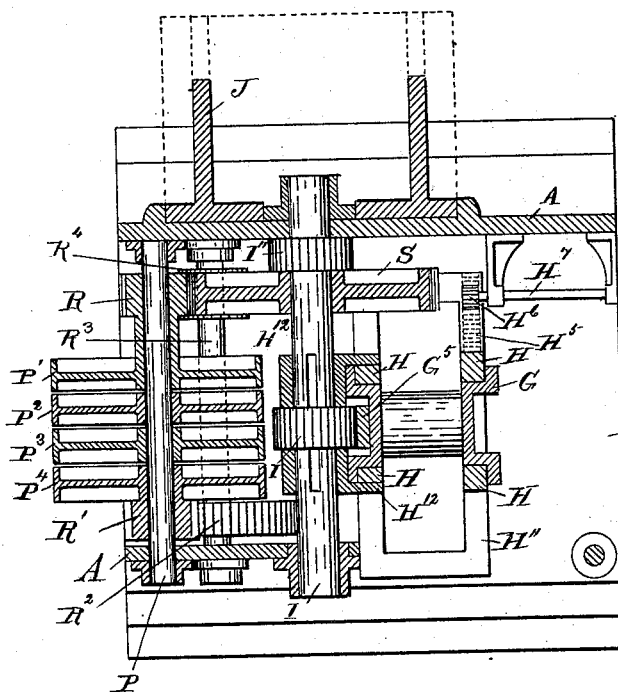
Figure 6:
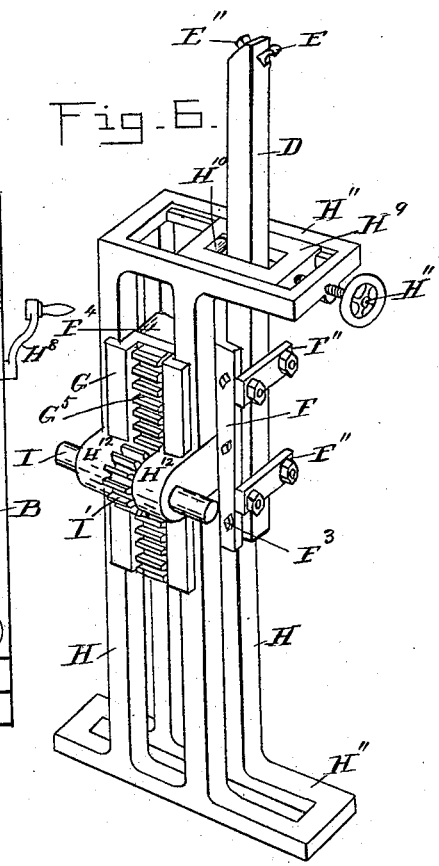
Figure 7:
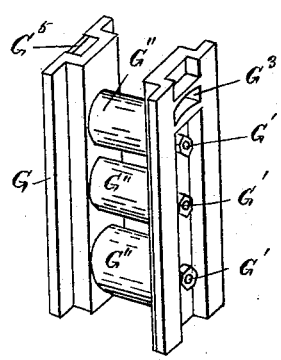
Figure 8:
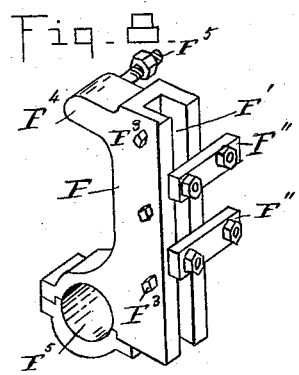

Figure 1 is a front elevation of my improved machine with the vise detached. Fig. 2 is a vertical cross-section on line X X in Fig. 1. Fig. 3 is a vertical cross-section on line Y Y in Fig. 1. Fig. 4 is a vertical longitudinal section on line X' X' in Fig. 3. Fig. 5 is a horizontal section on line Z' Z' in Fig. 2. Fig. 6 is a detached perspective view of the guide and cross-head of the key-seater. Fig. 7 is a detached perspective view of the sliding cross-head of the same. Fig. 8 is a detached perspective view of the tool-holder of the key-seater. Fig. 9 is a front elevation of the tool-bar. Fig. 10 is a cross-section of the same on line $X^2 X^2$ in Fig. 9. Fig. 11 is a vertical central section of the same. Fig. 12 is a longitudinal section of the cutter detached from the bar. Fig. 13 is a cross-section on line Y' Y' in Fig. 12. Fig. 14 is an end view of Fig. 12. Fig. 15 is a detached perspective view of the vise, and Fig. 16 is a detached perspective diagram view of a portion of the reversing mechanism.

A is the frame of the machine, which supports the operating parts thereon.

B is a base upon which said frame is supported.

C is a table provided with the usual undercut mortises C', for the clamping-bolts ordinarily used to hold the work to the table.

C'' is a slot in the table through which the tool-bar projects.

$C^3$ are detachable table-extensions, which may be used when the size of the work requires. These are preferably secured by means of the screw-bolts $C^4$, which pass through vertical flanges formed on the abutting sides of the table and table-extension, and the projecting flange $C^5$ is formed on the inner edge of each table-extension to engage with the corresponding offset.

D is the tool-bar operating through the slot $C^2$ in the table. The tool-bar may be of various sizes and forms for different work, but for ordinary key-seating I prefer the form shown in Figs. 9, 10, and 11, which is substantially rectangular in cross-section, and provided with the concave face D' and the chamfered corners D'', which are planed perfectly true and parallel to serve as guides in adjusting the work to the tool. The concave face D' provides a ready clearance for the cuttings.

E is the tool or cutter, preferably formed with its head of rectangular cross-section and concaved upon its under side to allow a ready clearance of the cuttings. The shank E' is set in an inclined socket in the tool-bar and secured therein by a set-screw E''. The cutting-edge $E^3$ of the tool cuts the full width of the keyway, and, owing to the inclination of the tool in relation to the tool-bar, the springing of either the tool-bar or the tool will not have the tendency to crowd the cutting-edge farther into the work, as in the ordinary construction, where the shank of the tool is secured to the tool-bar at a right angle.

F is the tool-holder which carries the tool-bar. This holder, as shown in Fig. 8, is provided upon its front side with a recess F', into which the tool-bar is fitted, and in which it is detachably secured by means of clips or straps F'' and set-screws $F^3$. A guide-lug $F^4$ is formed at the upper rear corner of the tool-holder, and a journal-box $F^5$ is formed near the lower rear corner thereof.

G is a vertically-reciprocating cross-head which carries the tool holder. This cross-head, as shown in Fig. 7, consists of two plates which slidingly engage upon the guide-bars H of a sliding carriage, as shown in Fig. 6. These plates are secured parallel to each other with the necessary distance apart by transverse bolts G', upon which the thimbles G″ are sleeved. Upon the lowest one of these thimbles the box F⁵ of the tool-holder is journaled free to be adjusted thereon. The guide-lug F⁴ engages between the plates of the cross-head, and a pin F⁶ on said lug engages in a segmental circular slot G³ in the cross-head, Fig. 7, and by means of a screw-nut F⁷ on this pin the tool-holder may be adjustably secured to the cross-head, if desired. As shown in Fig. 3, a spring G⁴ is secured at one end to the cross-head and at the other to the lug F⁴ in such manner that the tension of the spring tends to draw the tool-holder toward the cross-head. Upon the outside of the cross-head G a rack-bar G⁵ is formed or secured, and this engages with a pinion I′ upon the shaft I.

H are the vertical guide-bars of the carriage on which the cross-head G reciprocates. These guide-bars are united on their upper and lower ends by the horizontal plates H″, which slide in horizontal guide-bearings H³ H⁴, formed, respectively, on the outside of the table and on the upper side of the bed-plate B, as shown in Fig. 4. To one of the vertical guide-bars of the carriage is secured, as shown in Figs. 3 and 4, a feed-rack H⁵, into which engages the feed-pinion H⁶ on a shaft H⁷, which extends to the side of the machine and is provided with a handle H⁸, whereby the operator feeds the tool-bar to the work.

To adjust the tool-bar to work in a vertical line, or at an angle thereto, I construct within the sliding plate H′ of the carriage the sliding plate H⁹, which carries the tool-bar by the roller H¹⁰, which bears against the back of the tool-bar and has a set-screw H¹¹ for adjustment. As the tool-holder is free to oscillate on its bearings G″ on the cross-head G, the set-screw H¹¹ will adjust it to any desired inclination, the spring G⁴ holding the tool-bar firmly in contact against the roller H¹⁰. The object of adjusting the tool-bar to any desired inclination is to cut either straight or tapering key-seats into the hubs of wheels and pulleys, allowing the work to be set square and plumb on the table.

The cross-head G always reciprocates in a true vertical line, while the tool-bar is guided by the adjustment of the frame H⁹, which, when so adjusted as to throw the tool-bar out of plumb, does not carry the tool strictly in a straight line, yet as the taper of key-seats is generally but very slight the difference becomes too small to be of any consequence.

The shaft I, which communicates motion to the pinion I′, is automatically reversed by reversing mechanism hereinafter described, so as to produce a reciprocating motion of the tool-bar. The pinion I′, in order to permit the feeding of the tool-bar, slides on the shaft I, with a feather engaging in a groove of the shaft. It is kept in engagement with the rack-bar G⁵ by being carried between bearings H¹², secured to the guide-bars H.

The device for cutting key-seats into shafts and for cutting keys is arranged as follows:

A tool-holder or slide O is secured in suitable horizontal guides formed on the part O′ of the frame of the machine. This tool-holder is reciprocatingly actuated by means of a pinion I″, which engages into a rack-bar O″ on the outside of the tool-holder. As this pinion is on the shaft with the pinion I′, which reciprocatingly actuates the vertical tool-bar, the same reversing mechanism controls both. O³ are the tool-sockets formed in the tool-holder to secure a suitable tool or tools O⁴ for planing keys or for cutting keyways into shafts.

J is a bracket vertically adjustably secured to the frame A by means of the bolts J′ and the vertical adjusting-screw J″, as shown in Figs. 1 and 2.

K is a table secured upon the bracket J. L is a bed-plate slidingly secured upon the table K by bolts L′, passing through slots in the plate L. The plate L is provided on the under side with a lug-nut L″, Fig. 2, into which engages a feed-screw K′, which is stationarily journaled in the table K. The lug-nut L″ slidingly engages in a slot K″ in the table K, and said slot, being planed and fitted to the lug L″, acts also as a guide, in combination with the bolts L′, to feed the plate L parallel with itself when the feed-screw K′ is turned.

M is the body of a vise. It is swiveled on the pin M′ to the plate L, and may be secured thereto at any desired angle by the bolts M″, which pass through segmental circular slots M³.

N is the vertical movable jaw of the vise, actuated by the vertical clamp-screw N′ and slidingly secured to the body of the vise by bolts N″, which pass through vertical slots N³.

N⁴ is the stationary jaw of the vise formed on the body M.

When it is desired to use the key-cutting mechanism to plane keyways in shafts too large to be held in the vise, the latter may be removed from the plate L and the shaft set in a longitudinal V-shaped groove K³, formed in the plate and clamped thereon in the usual way by bolts, the heads of which engage in suitable T-shaped grooves L³, extending across the plate L. An adjustable screw-stop L⁴ is secured to the plate L, and carries a set-screw which is adapted to abut against the plate L. By this construction and arrangement of the key-cutting mechanism a large number of keys may be secured in the vise and planed to one size by simply feeding into the plate L until the screw-stop abuts against the plate K, and as a number of cutting-tools may be used simultaneously it is obvious that in cutting short keys the whole length of the vise may be utilized for work, the stroke of the slide being adjusted to the length of keys, as will appear hereinafter.

The means of imparting motion to the tool-holders, reversing the stroke of the same, and adjusting the stroke's length are more fully shown in Figs. 1, 2, 4, 5, and 16, and are arranged as follows: A shaft P, Fig. 5, is rigidly secured to the frame, and carries four pulleys P' P'' P³ P⁴, journaled upon it. The pulleys P² and P³ are the idler-pulleys, and the pulleys P' and P⁴ are the driving-pulleys which transmit the motion to the operating parts of the machine through pinions R and R', which are respectively secured to the hubs of the driving-pulleys P' and P⁴. The pinion R transmits its motion directly to the drive-shaft I by engaging with the gear-wheel S upon said shaft. The pinion R' transmits its motion indirectly and in a reverse direction to the said shaft I through the intermediate shaft R³ by means of an intermediate gear-wheel R'', meshing with the pinion R', and a pinion R⁴, meshing with the gear-wheel S on the shaft I. The motion from the shaft I is imparted to the tool-holders through pinions I' and I'' on said shaft, in the manner already described.

To reverse the motion and adjust the length of stroke, the device shown in Figs. 2 and 16 is employed, and consists of an arm or striker T, secured to the slide or tool-holder of the key-cutting mechanism and projecting rearwardly through a horizontal slot T' in the frame. In proximity to the path of this striker is slidingly secured in bearings the shifting-bar T''', upon which are adjustably secured the collars T³, which are projecting into the path of the striker T. The shifting-bar T''' carries a pin T⁴, which engages with one arm of the bell-crank T⁵, the other arm of which controls the sliding belt-shifter T⁶.

The parts being constructed as shown and described, they are intended to operate as follows: The motion of the slide O in one direction brings the striker-arm in contact with the collar T³ and shifts the bar T''' in the same direction. The motion being transmitted, causes the belt-shifter to reverse the belt—that is, the belt on one of the drive-pulleys is shifted onto its idler and the belt on the other idler is shifted onto its drive-pulley, thus reversing the motion in one direction, while the action of the striker T against the other collar reverses the motion when the slide travels in the opposite direction.

It is obvious that by adjusting the collars T³ from or toward the striker the stroke of the tool-holders may be adjusted to any desired length.

The practical advantage of my machine in being adapted for key-seating shafts as well as wheels and pulleys and for cutting the keys therefor will be readily conceded. Besides this special work, my key-cutting attachment is adapted to a variety of work.

The extensions which I preferably provide for the table form a very desirable attachment in cutting key-seats into the eyes of connecting-rods, &c.

What I claim as my invention is—

1. In a key-seating machine, the combination, with the supporting-frame, of a top or table C, and a table-extension C³, detachably secured to one side of the table and provided with the supporting-flange C⁵, substantially as described.

2. In a key-seating machine, the combination, with the supporting-frame, of the horizontally-sliding carriage provided with feeding mechanism, the vertically-reciprocating cross-head engaging upon said carriage, the tool box or holder pivotally secured to said cross-head, and the tool-bar secured to said tool-holder, substantially as described.

3. In a key-seating machine, the combination, with the supporting-frame, of the horizontally-sliding carriage provided with the vertical guide-bars, the reciprocating cross-head engaging upon said guide-bars, the tool-box pivotally secured to said cross-head, the tool-bar secured to the tool-box, the adjustable frame H⁹, carrying the roller H¹⁰, and the spring G⁴, all substantially as described.

4. The combination of the cutter E, provided with the shank E', and the tool-bar provided with the inclined socket in which said cutter is secured, substantially as described.

5. The combination of the tool-bar D, the concave face D' of the tool-bar, the cutter E, and the concave lower face of the cutter, substantially as described.

6. The combination of the tool-bar D, the concave face D' thereof, the cutter E, provided with the shank E', secured in an inclined socket of the tool-bar, and the chamfered corners D'' of the tool-bar, substantially as described.

7. The combination of the reciprocating cross-head G, the bearing G'', formed thereon, the tool-box pivotally secured upon said bearing and carrying the tool-bar, the guide-lug F⁴ on the tool-box, the guide-pin F⁵ on said guide-lug, and the curved slot G³, in which said pin is adapted to be adjustably secured, substantially as described.

8. The combination, with the supporting-frame, of the sliding carriage provided with the vertical guide-bars H, and horizontal guide-plates H' and H'', uniting them at the upper and lower ends, the reciprocating cross-head G, provided with the bearing G'', the tool-box F, pivotally secured to said bearing, the spring G⁴, and the adjustable frame H⁹, carrying the roller H¹⁰, substantially as described.

9. The combination, in a key-seating machine, of the supporting-frame, the table, the vertically-reciprocating key-seater, and the horizontally-reciprocating combined key-seating and key-cutting device provided with a vertically-adjustable table adapted to carry the work, substantially as described.

10. The combination, in a key-seating machine, of the vertically-reciprocating key-seater provided with the work-supporting table, and the horizontally-reciprocating combined key-seating and key-cutting device provided with a table adapted to carry the work and having a vertical and a horizontal feed, substantially as described.

11. In a key-seating machine, the combination of the supporting-frame, the work-supporting table, the vertically-reciprocating key-seater, the horizontally-reciprocating slide O, carrying the cutters, the vertically-adjustable bracket having the feed-screw J'', and the sliding bed-plate L, provided with the work-securing devices, and the feed-screw K', substantially as described.

12. The combination, with the vertically-reciprocating cross-head G of the key-seater, and the horizontally-reciprocating slide O of the key-cutter, of the shaft I, provided with the sliding pinion I' and fixed pinion I'', adapted to communicate motion to said key-seater and key-cutter, respectively, the stationary shaft P, provided with the idler-pulleys P'' and P³, the drive-pulleys P' and P⁴, having direct and reverse drive-connections with the shaft I, the belt-shifter T⁶, the shifting-bar T'', and the striker-arm T on the reciprocating key-cutter, substantially as described.

In testimony whereof I affix my signature, in presence of two witnesses, this 19th day of February, 1889.

GEORGE W. MARSHALL.

Witnesses:
J. PAUL MAYER,
RICHARD S. MALLORY.